United States Patent [19]
Winton, III

[11] Patent Number: 5,489,175
[45] Date of Patent: Feb. 6, 1996

[54] FLUSH-MOUNTING RIGHT-ANGLE FASTENER

[76] Inventor: George R. Winton, III, 242 Ashbourne Trail, Lawrenceville, Ga. 30243

[21] Appl. No.: 248,961

[22] Filed: May 25, 1994

[51] Int. Cl.⁶ .................... F16B 37/00; F16B 37/04
[52] U.S. Cl. .................... 411/104; 411/180; 411/427
[58] Field of Search .................... 411/104, 179, 411/180, 181, 183, 427

[56] References Cited

U.S. PATENT DOCUMENTS

| | | | |
|---|---|---|---|
| 3,127,919 | 4/1964 | Swanstrom . | |
| 3,187,796 | 6/1965 | Double | 411/181 X |
| 3,443,617 | 5/1969 | Whiteside et al. | 411/180 |
| 3,527,280 | 9/1970 | MacNorius | 411/104 X |
| 3,770,037 | 11/1973 | Ernest . | |
| 4,130,138 | 12/1978 | Swanstrom | 138/109 |
| 4,370,794 | 2/1983 | Bien et al. | 411/180 X |
| 4,861,182 | 8/1989 | Gillet | 411/104 X |

OTHER PUBLICATIONS

Winton (Ser. No. 08/153151) Nov. 15, 1993.

Primary Examiner—Neill R. Wilson

[57] ABSTRACT

A self-clinching fastener used to join two sheet materials together at a right angle. The self-clinching fastener is of the flush-mounting type and thus provides for a smooth cosmetic appearance when installed.

3 Claims, 4 Drawing Sheets

5,489,175

FLUSH-MOUNTING RIGHT-ANGLE FASTENER

BACKGROUND—FIELD OF INVENTION

The present invention relates to a self-clinching fastener used to join two sheet materials at a right angle, and more particularly involves a clinching technique that promotes a flush surface appearance between the self-clinching fastener and its surrounding sheet material.

BACKGROUND—DESCRIPTION OF PRIOR ART

In the sheet metal industry, it is common to join two sheet materials together at a right angle by employing a right-angle bracket along with an assortment of commonly found self-clinching studs and/or self-clinching standoffs. Such fasteners are discussed in U.S. Pat. No. 4,130,138 which was issued to Kenneth A. Swanstrom on Dec. 19, 1987, U.S. Pat. No. 3,127,919 which was issued to K. A. Swanstrom on Apr. 7, 1964, and U.S. Pat. No. 3,770,036 which was issued to Richard B. Ernest on Nov. 6, 1973. Since the sheet materials are often too thin to tap, self-clinching fasteners are typically imbedded into a thin sheet material to give the sheet material adequate male and/or female threads. Flush-type studs and standoffs, as discussed above, not only require a large pull-out force to dislodge the fastener after it has been installed, but also allows the embedded fastener and mating sheet material to be painted after the self-clinching fastener has been installed. This is a benefit to the sheet metal industry because the flush appearance of the embedded self-clinching stud and/or standoff provides for a smooth cosmetic appearance. This is of significant concern when the flush side of a sheet material requires painting.

A limitation of the conventional self-clinching flush-type fasteners is that they only permit parallel surfaces to be joined together. Thus, If two sheet materials require joining at a right angle, additional costs are usually incurred by the introduction of a right-angle bracket. The manufacturing costs can quickly rise when adding the costs required to fabricate a bracket to the costs of installing the self-clinching studs and/or standoffs necessary to join the two sheet materials to a bracket.

The cost problem was partly addressed by a self-clinching right-angle fastener as described in pending U.S. Patent application by the same inventor, Ser. No. 08/153,151. Its limitation is realized when a flush cosmetic appearance is necessary on the sheet material that supports the embedded right-angle fastener. Because the invention disclosed in Ser. No. 08/153,151 functions on the same side of a sheet material for which it is installed, a flush appearance is not guaranteed on the opposite side of the sheet material. A further limitation of the above right-angle fastener involves the force required to dislodge the fastener once it has been embedded into a sheet material. Because the fastener functions on the same side of a sheet material as it was installed, a small pull-out force is more likely to dislodge the fastener from a sheet material. A further limitation of this fastener is that it requires a mating sheet material to have at least two machined features so that the fastener can be properly located.

SUMMARY OF THE INVENTION

Accordingly, several objects and advantages of my invention are:

(a) to fasten two sheet materials together at a right angle with a single self-clinching fastener;

(b) to provide a smooth cosmetic appearance between the embedded inventive fastener and its surrounding sheet material;

(c) to increase the dislodging force;

(d) to reduce the number of machined features in the mating sheet material.

Further objects and advantages are to reduce assembly costs of two perpendicular sheet materials by introducing fewer parts into an assembly. Still further objects and advantages will become apparent from a consideration of the ensuing description and drawings.

DESCRIPTION—FIGS. 1–2

Figure 1:
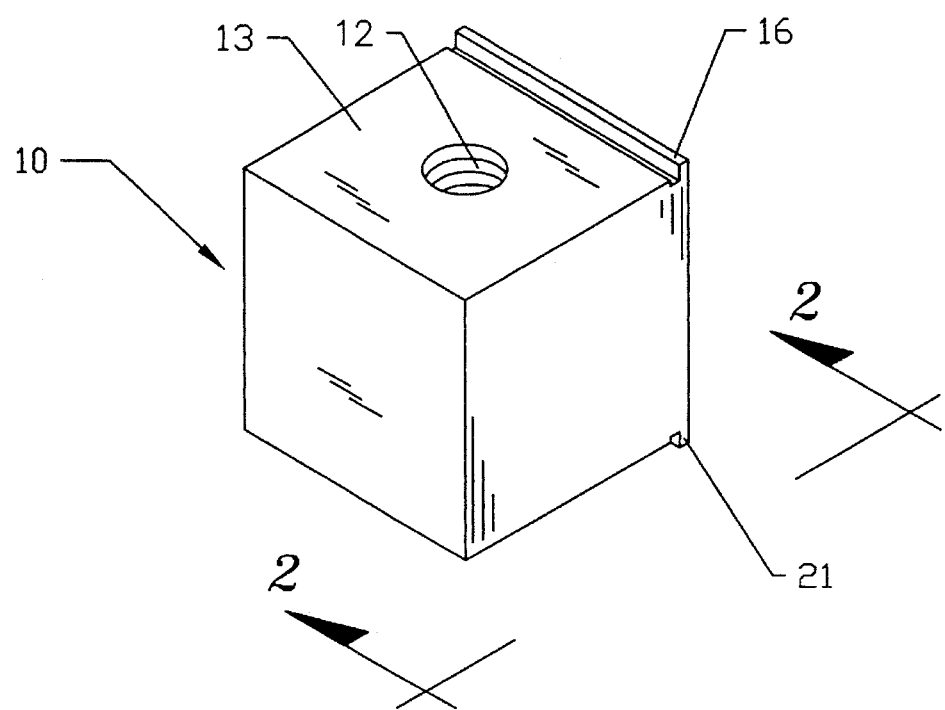
FIG. 1 shows an isometric view of the first embodiment.
Figure 2:
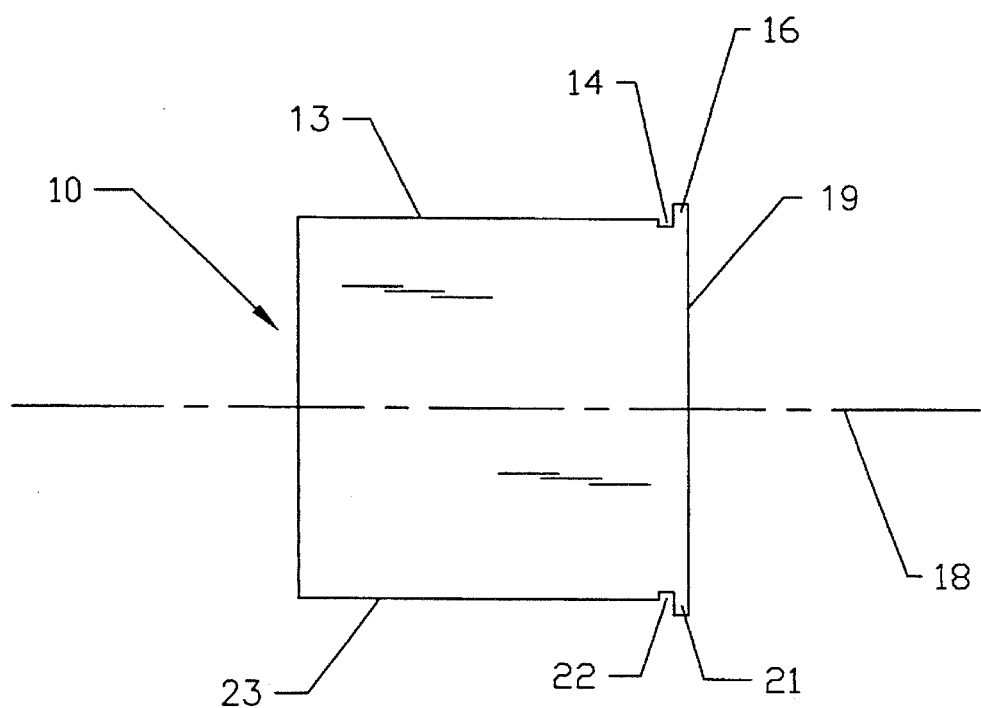
FIG. 2 shows a two dimensional detail of the first embodiment as seen along the line 2—2 of FIG. 1.

With initial reference to FIGS. 1 and 2, the first embodiment 10 is shown. Located through a first surface 13 is a threaded hole 12. Threaded hole 12 extends perpendicular to first surface 13. Formed adjacent to first surface 13 and extending slightly below first surface 13 is a first undercut groove 14. Formed adjacent to first undercut groove 14 and extending slightly above first surface 13 is a first land 16. With further reference to FIG. 2, a second surface 23 is located parallel to and offset form first surface 13. A second land 21 and a second undercut groove 22 are located symmetrically apart from first land 16 and first undercut groove 14 respectively with respect to an axis 18. A third surface 19, connecting first land 16 and second land 21, is parallel to threaded hole 12 and perpendicular to first surface 13 and second surface 23.

Figure 3:
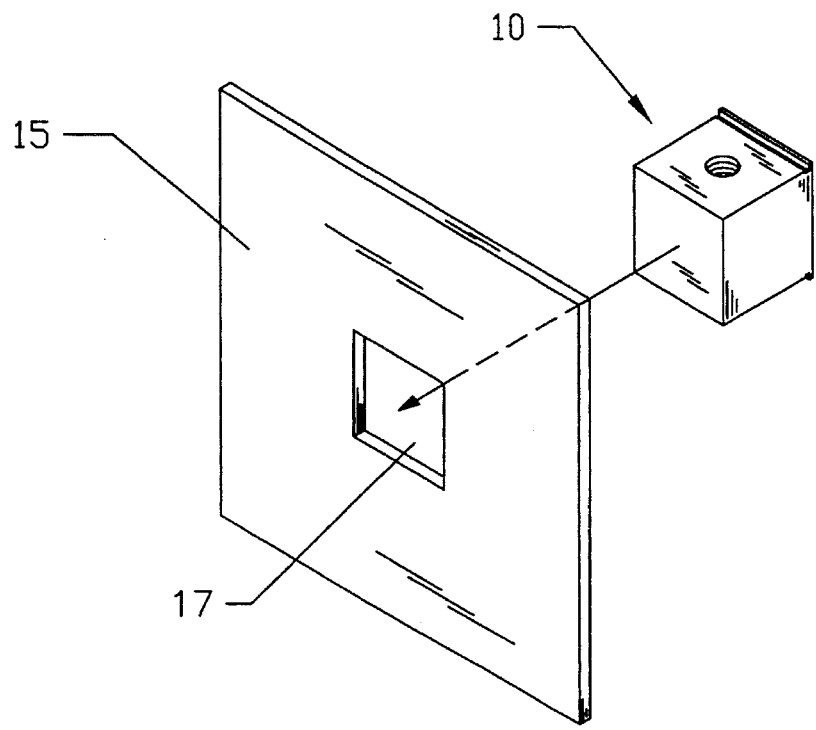
FIG. 3 shows an exploded view of the first embodiment in relation to a sheet material.
Figure 4:
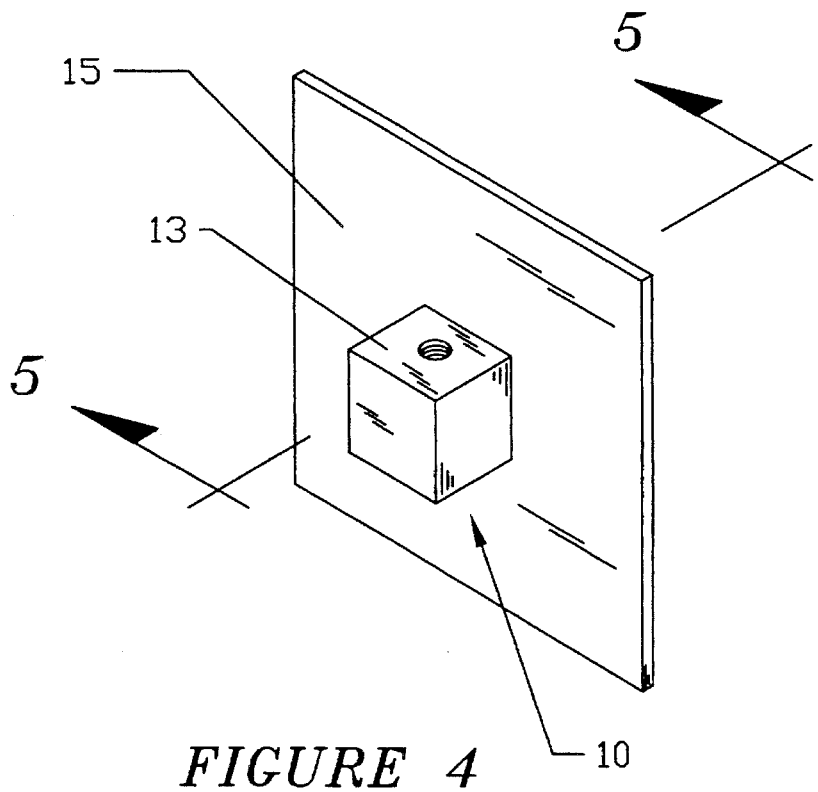
FIG. 4 shows the first embodiment installed into a sheet material.
Figure 5:
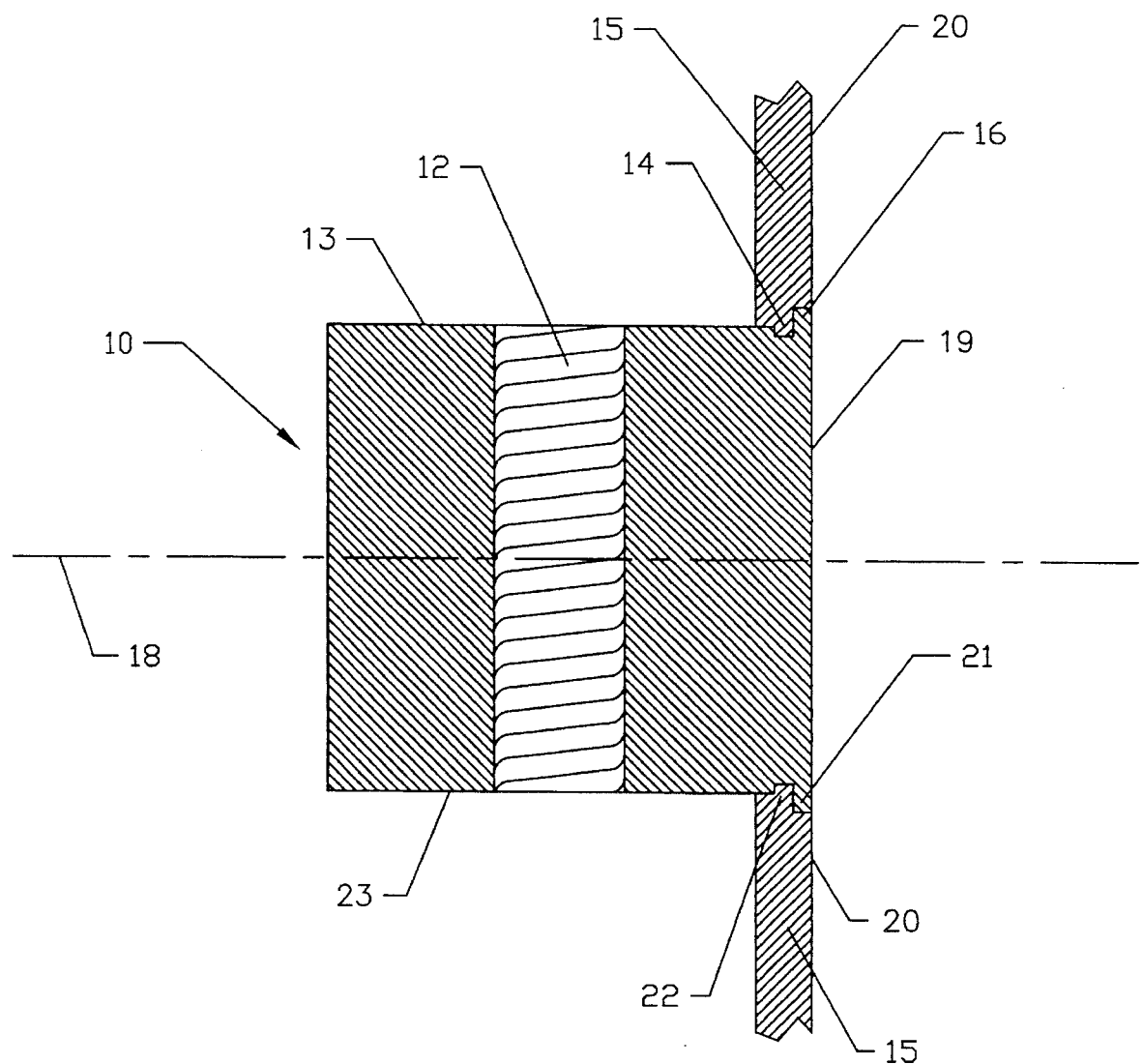
FIG. 5 shows a sectional view of the first embodiment embedded into a sheet material along the line 5—5 of FIG. 4.

Operation—FIGS. 3, 4, and 5

With initial reference to FIG. 3, first embodiment 10 is passed through a slightly larger cutout 17 located in a sheet material 15. With reference to FIG. 5, as a mechanical force is applied to third surface 19, both first land 16 and second land 21 displace material from sheet material 15 into first undercut groove 14 and second undercut groove 22. By doing so, first embodiment 10 becomes mechanically bonded to sheet material 15. When first embodiment 10 is fully inserted into sheet material 15, third surface 19 will be in the same plane (flush) as a forth surface 20 which is located on sheet material 15.

Figure 6:
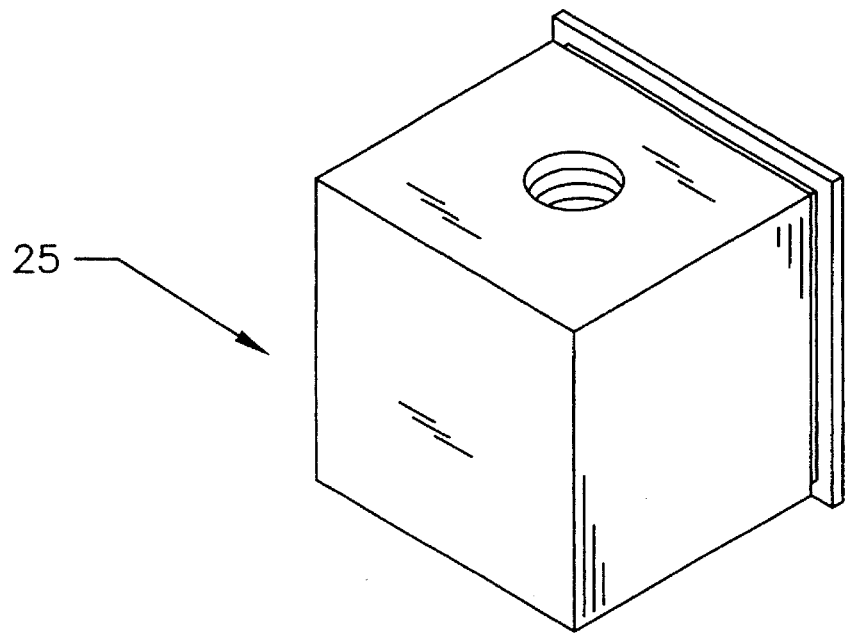
FIG. 6 shows an isometric view of the second embodiment.

While the above description contains many specifications, these should not be construed as limitations on the scope of the invention, but rather as an exemplification of the first embodiment thereof. For example, FIG. 6 shows a second embodiment 25 that employees four lands and four undercut grooves where all lands and corresponding undercut grooves are located within the same plane ninety degrees apart. By adding the additional lands and undercut grooves, a stronger mechanical bond will exist between the sheet material and the embedded fastener. Also, a greater force will be required to dislodge the second embodiment due to the additional mechanical bonding.

Figure 7:
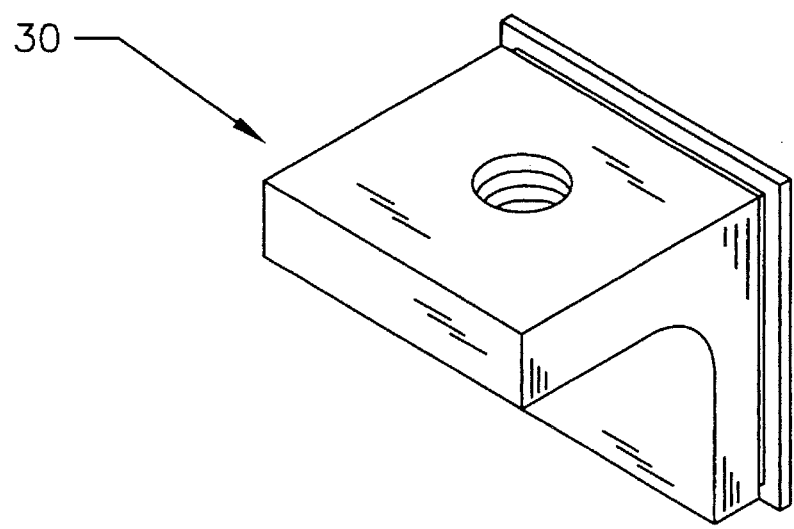
FIG. 7 shows an isometric view of the third embodiment.

With reference to FIG. 7, a third embodiment 30 is similar to second embodiment 25 with the exception of the "L" shaped profile. In addition to conforming to the "look" of a conventional right-angle bracket, less machining is required when tapping threaded hole 12; thus the life of the threading tool is extended.

Accordingly, the scope of the invention should be determined not by the embodiments illustrated, but by the appended claims and their legal equivalents.

I claim:

1. A self-clinching fastener for joining two sheet materials at a right angle, said self-clinching fastener comprising a body:

first and second surfaces on said body spaced apart and parallel to one another;

a first land extending beyond said first surface in a first direction perpendicular to said first surface;

a second land extending beyond said second surface in a second direction perpendicular to said second surface;

a third surface perpendicular to said first and second surfaces and extending from said first land to said second land;

a first undercut groove formed between said first surface and said first land;

a second undercut groove formed between said second surface and said second land; and a threaded hole located at said first surface, said threaded hole extends parallel to said third surface.

2. The self-clinching fastener as claimed in claim 1, wherein said self-clinching fastener has a substantially L-shaped cross section in a plane perpendicular to said first through third surfaces.

3. The self-clinching fastener as claimed in claim 1, further comprising:

fourth and fifth surfaces spaced apart and parallel to one another and perpendicular to said first through third surfaces;

a third land extending beyond said fourth surface in a third direction perpendicular to said fifth surface;

a fourth land extending beyond said fifth surface in a fourth direction perpendicular to said fourth surface;

said third surface extending from said third land to said fourth land;

a third undercut groove formed between said fourth surface and said third land; and a fourth undercut groove formed between said fifth surface and said fourth land.

* * * * *